Nov. 18, 1969         F. C. HOFFMAN ET AL         3,478,558
                         DEBURRING TOOL
                      Filed March 9, 1967
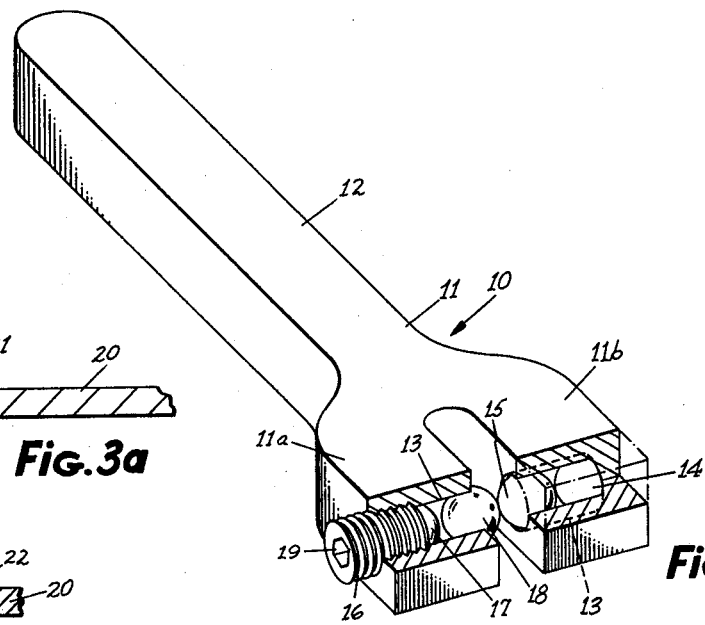
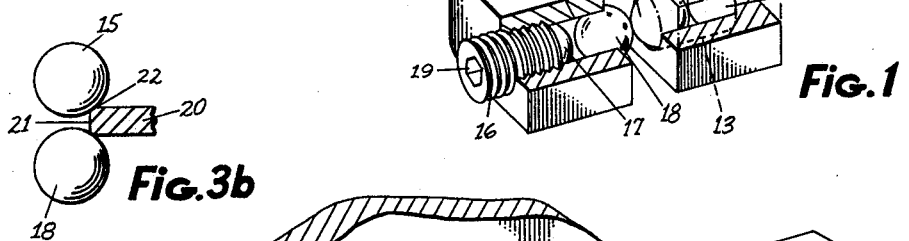
INVENTOR/S
FLOYD C. HOFFMAN &
THEODORE W. MILLER,
BY *Melville, Strasser, Foster and Hoffman*
ATTORNEYS 3,478,558
DEBURRING TOOL
Floyd C. Hoffman, Butler, and Theodore W. Miller, Chicora, Pa., assignors to Armco Steel Corporation, Middletown, Ohio, a corporation of Ohio
Filed Mar. 9, 1967, Ser. No. 621,926
Int. Cl. B21b 1/00
U.S. Cl. 72—199                         3 Claims

ABSTRACT OF THE DISCLOSURE

A deburring tool for mashing burrs from cut edges of sheet metal which comprises generally two aligned, freely rotatable spaced apart balls through which the cut edges of sheet metal are drawn, causing the burrs thereon to be mashed against the sheet metal.

BACKGROUND OF THE INVENTION

Field of invention

This invention relates to an improved device for masning burrs from cut edges of sheet or strip metal such as steel, which does not require a great amount of pressure in order to be operative, and which does not necessitate secure and accurate positioning and continuous adjustment of the working portion thereof.

Description of the prior art

A burr is normally produced on sheet metal edges when they are cut on a shear or are slit longitudinally. While the amount of burr depends both upon the adjustment of the cutting edges and on their sharpness, it has generally been found that the softer or more ductile the sheet metal being cut, the greater the tendency to produce burred edges during cutting. A problem of long standing in the art is encountered on slitting lines, where sheet metal is cut into strips of desired width by passing it between rollers having depending cutting blades extending therefrom, because burred edges produced during the cutting operation severely scratch the surface of the sheet metal strips as they are being coiled. Thus, it is desirable that the burrs on the edges of cut sheet metal be removed before the sheet metal is coiled.

Many devices for removing burrs from the edges of cut sheet metal have been utilized, but without satisfactory results. The most common method which has been employed for removing burrs from the edges of cut sheet metals is to simply cut the burrs off. The cutting operation is accomplished by rotary milling heads, stationary scraping blades and abrasive devices, such as files. While some of these devices apparently have worked at least adequately in removing the burrs, many problems have been encountered, not the least of these being the complexity of the burr cutting devices. For example, a deburrer device utilizing rotary milling heads is extremely complicated to operate. However, even with simple scraping blade devices, the blades must be securely and very accurately positioned. Additionally, in all the cutting devices the working portions thereof have a tendency to wear quickly, and this requires continuous inspection and adjustment.

While prior art devices primarily employ cutters to cut off the burrs on the edges of the cut sheet metal, rollers also have been used, but like the cutters, they have experienced very little success. For example, the normal roller devices comprise a roller having a concave surface which rounds the metal strip edges passed therethrough. This type of device has proven to be unsuccessful because the deformation of the strip edge requires a great amount of pressure, which in turn causes the sheet or strip to bow. Additionally, the rollers are required to be very securely and very accurately positioned.

With the foregoing considerations in mind, it is an object of the instant invention to provide an improved deburring tool which does not require a large amount of pressure against the workpiece in order to be operative.

Further, it is an object of the instant invention to provide an improved deburring tool which does not necessitate secure and accurate positioning of the working portion thereof.

An additional object of the instant invention is to provide an improved deburring tool which does not require continuous adjustment of the working portions thereof.

Still a further object of the instant invention is to provide an improved deburring tool which may operate in either direction.

It is still another object of the instant invention to provide an improved method for deburring the cut edge of sheet metal.

Finally, it is an object of the instant invention to provide an improved deburring tool which is not subject to the above-mentioned disadvantages, and which is simple in construction, economical in manufacture, and otherwise well suited to the purpose for which it is designed.

These and other objects of the invention which will be described in greater detail hereinafter, or which will be apparent to one skilled in the art upon reading these specifications, are accomplished by that certain construction and arrangement of parts of which the following describes two exemplary embodiments.

SUMMARY OF THE INVENTION

Briefly, one embodiment of the instant invention comprises a bifurcated member, the bifurcations of which have an aligned bore. The bore of one bifurcation does not extend completely therethrough, but has at its base a seat on which rests a metal ball. The aligned bore of the other bifurcation extends therethrough and is threaded for receipt of a threaded plug, the end of which provides a seat against which another metal ball may rest. Preferably these seats are convex. The space between the balls may be adjusted by movement of the threaded plug.

Another embodiment of the instant invention comprises a spring mounted deburring tool having a flat frame member on which four juxtaposed rollers are rotatably mounted, the rollers being arranged in substantially rectangular fashion. Each roller is provided with a concave run on its outer surface. The space between the four intersecting rollers and the surface of the flat frame member is provided with two aligned metal balls which roll freely therein, the balls being retained in the space by the outer circumferential edge of the rollers. The distance between the centers of the rollers may be adjusted so that various thicknesses of sheet metal may be drawn through the aligned balls and the rollers, and the burrs on the edges thereof may be satisfactorily mashed by the freely rotating metal balls.

BRIEF DESCRIPTION OF THE DRAWING

Reference is made to the drawings forming a part hereof and in which:

FIG. 1 is a partially sectioned perspective view of a deburring hand tool according to the instant invention.

FIG. 2 is a partially sectioned perspective view of a spring mounted deburring tool according to the instant invention.

FIG. 3a is a cross sectional, elevational view taken across a sheet metal strip showing the burrs on the cut edge thereof.

FIG. 3b is a partially sectioned view of the deburring operation according to the instant invention.

DESCRIPTION OF THE PREFERRED EMBODIMENTS

Referring now in more detail to the drawing, and particularly to FIG. 1, it may be seen that the hand deburring tool 10 of FIG. 1 comprises a bifurcated member 11 having bifurcations 11a and 11b, and a handle 12. Each bifurcation 11a and 11b is provided with an aligned bore 13, the bore 13 extending completely through the bifurcation 11a and at least partially into the bifurcation 11b. The bore 13 in the bifurcation 11b is provided with a surface 14 which acts as a seat against which the ball 15 may freely rotate. The bore 13 through the bifurcation 11a is threaded to receive the threaded plug 16, one end of which is provided with a surface 17 which acts as a seat for the freely rotating ball 18. The plug 16 may be adjusted by inserting a key into the hexagonal head 19, which in turn adjusts the spacing or play between the balls 15 and 18.

The hand deburring tool 10 may be easily assembled by first placing the ball 15 against the seat 14 in the bore 13 of the bifurcation 11b, and then placing the ball 18 into the bore 13 of the bifurcation 11a. The plug 16 is then threaded into the bore 13 of the bifurcation 11a until the seat 17 is contiguous with the ball 18 and the desired spacing or play between the balls 15 and 18 is reached. Preferably, the proper spacing or play between the balls 15 and 18 is such that when the balls 15 and 18 are contiguous with the seats 14 and 17, respectively, the distances between the surfaces of the balls 15 and 18, on a line joining the centers of the balls, is slightly less than substantially the thickness of the cut edge of the sheet metal which is to be deburred. If the distance between the bifurcations is less than the ball diameter, there is no danger of the balls falling out.

In operation, a metal strip 20 having a burred edge 21, as shown in FIG. 3a, is inserted between the balls 15 and 18, as in FIG. 3b. The tool 10 then moves along the edge 21, the balls 15 and 18 rotating thereagainst and mashing the burrs 22 against the surface of the sheet metal. As can be seen, the aligned metal balls 15 and 18 fully mash all of the burrs 22 against the edge 21 of the metal strip 20, even though the burrs 22 may extend substantially around the edge 21. The convex surface of the balls 15 and 18 allows a higher pressure per unit area with a given applied force, and thus a minimum applied force is required. This, of course, is not true with rollers, irrespective of how the rollers are mounted, because the rollers contact a greater surface area and therefore require a greater pressure to deform the burrs.

Turning now to FIG. 2, a spring mounted deburring tool 23 is shown. The deburring tool 23 comprises a flat split frame member 24 on which is rotatably mounted in a substantially rectangular fashion four juxtapositioned rollers 25. Each roller 25 is provided with a concave edge 26 around its circumference which acts both as a runner and a retaining member for the freely rotating balls 27 and 28 which are placed within the space 29 formed by the rollers 25 and the split frame member 24. The split frame member 24 is mounted against a wall 30 or other similar structure. The preferred mounting method utilizes coil springs 31 which hold the tool 23 in place, but allow for some flexibility when the strip 32 is drawn therethrough. The rollers 25 are mounted on the split frame member 24 so that the distance between the centers of the juxtapositioned rollers 25 may be changed, enlarging or narrowing the space 29 between the rollers 25 wherein the aligned balls 27 and 28 freely rotate.

As an exemplary disclosure, adjustment of the rollers 25 is accomplished by separating the first and second members 24a and 24b, respectively, of the split frame member 24 as the bolts 25a of the recessed slotted clips 25b are loosened. FIG. 2 shows the first and second members 24a and 24b, respectively, slightly apart, enlarging the space 29 between the rollers 25 wherein the aligned balls 27 and 28 freely rotate.

In operation, the metal strip 32 having a burred edge 33 is drawn between both the rollers 25 and the balls 27 and 28, the balls 27 and 28 mashing the burrs 34 contained thereon. The coil springs 31 keep the whole tool 23 urged against the edge of the workpiece and provide enough flexibility for the tool to compensate for any slight irregularities in the strip edge.

For deburring various ferrous products of normal sheet gauge, hardened ball bearings of about ⅝ inch diameter are satisfactory. They are preferably adjusted so that the distance between the balls is about .010 inch less than the thickness of the workpiece.

It will be understood that while the tool 23 is shown to be mounted on the support 30 with the coil springs 31, any other suitable mounting means whereby pressure is provided between opposite pairs of balls on opposite sides of the strip, including mounting directly onto a rigid structure, may be utilized.

It will be understood that modifications may be made without departing from the spirit of the invention and therefore no limitation other than those specifically set forth in the claims are intended or should be implied.

The embodiments of the invention in which an exclusive property or privilege is claimed are defined as follows.

We claim:

1. A deburring tool for mashing the burrs on the cut edge of sheet metal, which comprises two aligned, freely rotatable balls, said balls being spaced apart slightly less than substantially the thickness of said sheet metal and being freely rotatable within the space provided between four juxtapositioned rollers, said rollers being mounted rotatably on a flat frame member in a substantially rectangular fashion, each said roller being provided with a concave run on its outer surface, whereby as said cut edge of said sheet metal is drawn through said aligned balls, said balls freely rotate against the surface of said concave runners on said rollers and mash said burrs on said cut edge of said sheet metal against said sheet metal.

2. A deburring tool according to claim 1 wherein the distance between centers of said juxtapositioned rollers may be changed, thus enlarging or narrowing said space between said rollers wherein said aligned balls freely rotate, whereby various thicknesses of sheet metal may be drawn through said aligned balls and said rollers.

3. A deburring tool according to claim 2 wherein said flat frame member is mounted on a supporting structure by means of at least one spring, whereby as said cut edge of said sheet metal is drawn through said aligned balls and said rollers, said deburring tool is not completely rigid but exercises flexibility.

References Cited

UNITED STATES PATENTS

| | | | |
|---|---|---|---|
| 1,353,485 | 9/1920 | McGall | 76—89.2 |
| 1,798,882 | 3/1931 | Holtzman | 76—89.2 |
| 1,916,600 | 7/1933 | Benson | 76—89.2 |
| 2,247,887 | 7/1941 | Mascimbene | 29—90 |
| 2,451,860 | 10/1948 | Gunno | 76—89.2 |
| 3,049,788 | 8/1962 | Martin | 29—90 |

MILTON S. MEHR, Primary Examiner

U.S. Cl. X.R.

29—90; 72—470; 76—89.2